Patented June 4, 1940

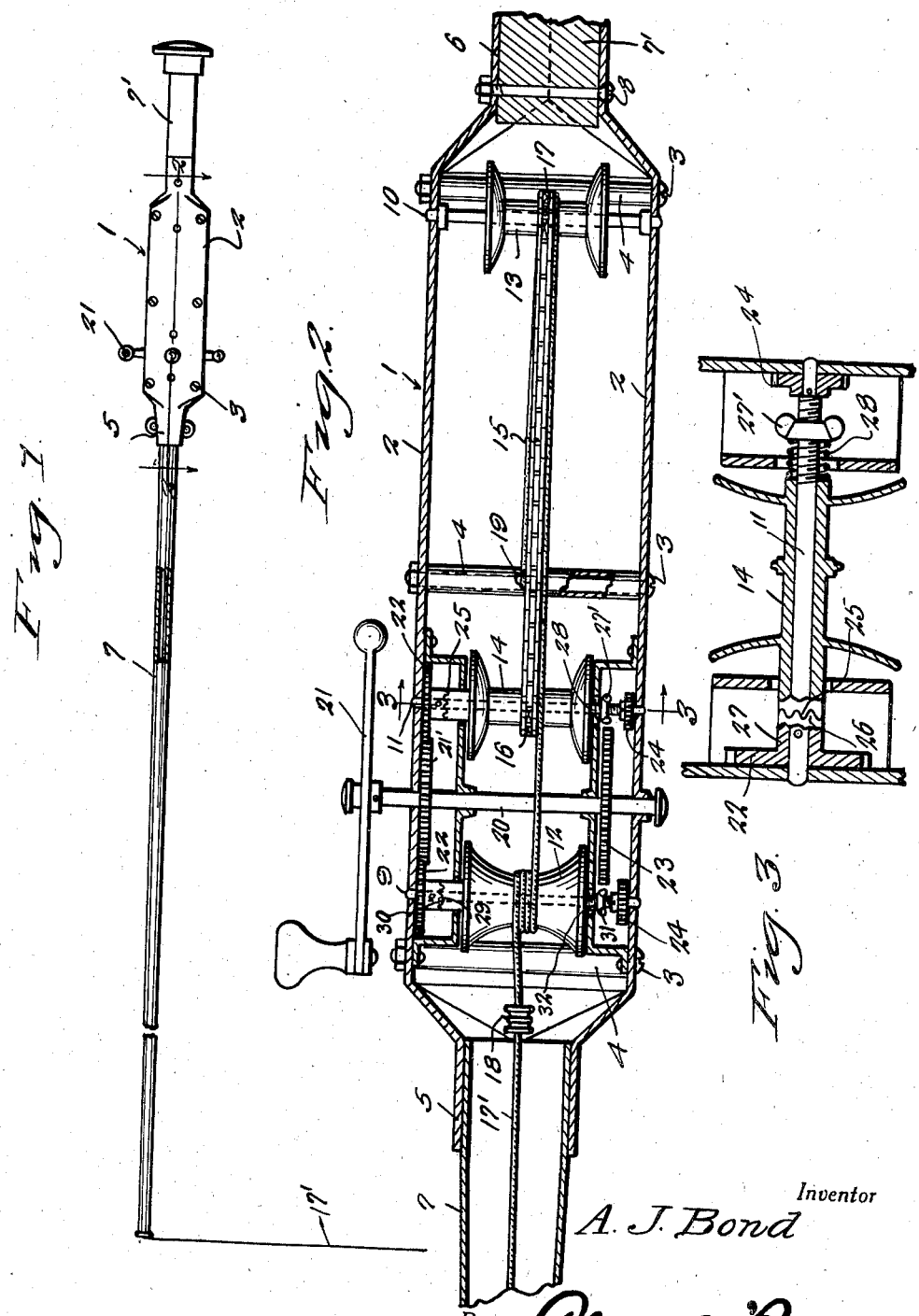

2,203,453

UNITED STATES PATENT OFFICE 2,203,453

REEL

Albert J. Bond, Brazoria, Tex.

Application November 9, 1938, Serial No. 239,710

1 Claim. (Cl. 242—84.5)

My invention relates to reels for fishing rods, more particularly of the type disclosed in my U. S. Patent No. 2,100,428, dated November 30, 1937, and over which the present invention is designed as an improvement.

In said patent I have disclosed a multiple spool reel with interconnected spools adapted for winding up the line in skein form from a cat-head spool and for feeding the line from said skein under control of said cat-head spool.

The principal object of the present invention is to equip a reel of the type above identified with inexpensive slip clutch devices whereby, in reeling operations, the skein may be wound with uniform tension, and whereby under a predetermined pull exerted on the line in a feeding direction the reel will pay off the line until the pull diminishes and thus prevent substantially any size catch from breaking the line.

Other and subordinate objects are also comprehended by my invention, all of which, together with the precise nature of my improvements, will be readily understood when the succeeding description and claim are read with reference to the drawing accompanying and forming part of the specification.

In said drawing:

Figure 1 is a view in side elevation illustrating a rod equipped with a reel constructed in accordance with my invention, Figure 2 is a fragmentary view in longitudinal section taken on the line 2—2 of Figure 1 looking in the direction indicated by the arrows, and drawn to an enlarged scale, and Figure 3 is a view in transverse section taken on the line 3—3 of Figure 2 looking in the direction indicated by the arrows and drawn to a further enlarged scale.

Referring to the drawing by numerals, the reel 1 with which the instant invention is more particularly concerned, comprises a pair of side frame plates 2 secured together adjacent the ends thereof, and also intermediate said ends, by bolts 3 and spacing sleeves 4. The frame plates 2 are adapted to form a front socket 5 and a rear socket 6, the former having fitted thereinto a hollow pole 7 and the latter having bolted therein, as at 8, the usual butt end hand-grip 7'. Journaled at their ends in the frame plates 2 are transversely extending front, rear and intermediate spindles, 9, 10 and 11, the front spindle 9 having loose thereon a cat-head spool 12 and the rear and intermediate spindles 10 and 11 serving as axis members for a pair of rear and front reel spools 13 and 14, respectively. The rear reel spool 13 is preferably fast on the spindle 10, whereas, the front reel spool 14 is loose on the spindle 11 for a purpose presently seen. A sprocket chain 15 trained over a pair of sprockets 16 and 17 on the front and rear reel spools 14 and 13, respectively, operatively connects the front reel spool 14 to said rear spool 13. The line 17' extends through the rod 7 by way of suitable guides, as at 18, and is wound around the cat-head spool 12 with the terminal end thereof connected, as at 19, to the sprocket chain 15. Intermediate the cat-head spool 12 and front reel spool 14 is an operating shaft 20 rotatably and slidably mounted in the frame plates 2 and having fast on one end thereof the usual operating crank 21. The operating shaft 20 is endwise movable into either of two positions in one of which a large gear 21' fast thereon meshes with a pair of smaller gears 22 fast on the spindles 9 and 11, respectively, and in the other position of which a gear 23 fast on said shaft meshes with another pair of gears 24 fast on the spindles 9 and 11, respectively, adjacent corresponding ends of the latter, the described gearing being for the purpose of varying the speed of operation of the cat-head and front reel spools 12 and 14 relative to the speed of rotation of the crank 21, as will be understood.

According to my invention, the front reel spool 14 is endwise slidable on the spindle 11 and provided at one end thereof with clutch teeth 25 for engagement with and disengagement from, under endwise movement of said spools in opposite directions, similar clutch teeth 26 provided on a hub 27 of the gear 22 fast on the spindle 11. A wing nut 27' is threaded onto the spindle 11 adjacent to the opposite end of said spool 14 and a suitable coiled spring 28 is interposed between said nut and said end of the spool 14 to urge the latter toward the hub 27 and thereby engage the teeth 25 with the teeth 26. The cat-head spool 12 is also endwise slidable on its spindle 9 in the same manner as spool 14 and for the same purpose, said spool 12 being provided with clutch teeth 29 engageable with clutch teeth 30 on the related gear 22 and said spool 12 being variably tensioned in the same manner as spool 14 by a wing nut 31 and spring 32.

As will be understood, the nuts 27' and 31 and spring 28 and 32 provide means for variably tensioning the front reel spool 14 and cat-head spool 12 whereby the teeth 25 and 26 on the one hand and teeth 29 and 30 on the other are yieldingly engaged for disengagement under a predetermined pull exerted against said spools 14 and 12 in either direction of rotation thereof.

Referring now to the operation, by rotation of the crank 21 in opposite directions, the cat-head spool 12 and front reel spool 14 may be caused to rotate in opposite and similar directions to reel up the line 17' on the spools 14 and 13, in skein form, or feed the same from said skein under control of the cat-head spool 12. By selective adjustment of the nuts 27', 31 on the spindles 11 and 9 the springs 28 and 32 may be variably tensioned so that the teeth 25 and 29 will disengage under a predetermined pull exerted on the line 17' and the spools 14 and 12 thereby permitted to slip on the spindles 11 and 9 until the pull is reduced below that predetermined. Thus, in reeling up the line 17' against the pull exerted in opposition by a catch, when the pull on the line exceeds that predetermined by the setting of the nuts 27', 31 the front spool 14 and cat-head spool 12 will slip on the spindles 11 and 9 and permit the line to feed outwardly until the pull exerted by the catch is reduced as above described. Furthermore, in reeling up the line 17', under similar conditions, as the size of the skein increases, the front reel spool 14 will slip on the spindle 11 to compensate for the difference in the increased length of the winding and the uniform length unwound from the cat-head spool 12.

The foregoing will, it is believed, suffice to impart a clear understanding of my invention without further explanation.

Manifestly the invention, as described, is susceptible of modification in structure and use in connection with other types of reels without departing from the inventive concept, and right is herein reserved to such modifications as fall fairly within the scope of the subjoined claim.

What I claim is:

In a reel for fishing rods, a frame, a spindle rotatably mounted in said frame, a reeling spool rotatable and endwise movable on said spindle, means operative to rotate said spindle including a crank operated gear drive embodying a gear fast on the spindle, toothed coacting slip clutch devices on said gear and spool, respectively, adapted under endwise movement of the spool in one direction to permit slipping of said spool on said spindle, and settable means for variably tensioning said spool against such endwise movement.

ALBERT J. BOND.